Nov. 22, 1927.  1,650,132
H. C. JONES
METHOD OF AND MEANS FOR REGISTRATION OF PHOTOGRAPHIC PLATES
Filed Feb. 24, 1923   3 Sheets-Sheet 1
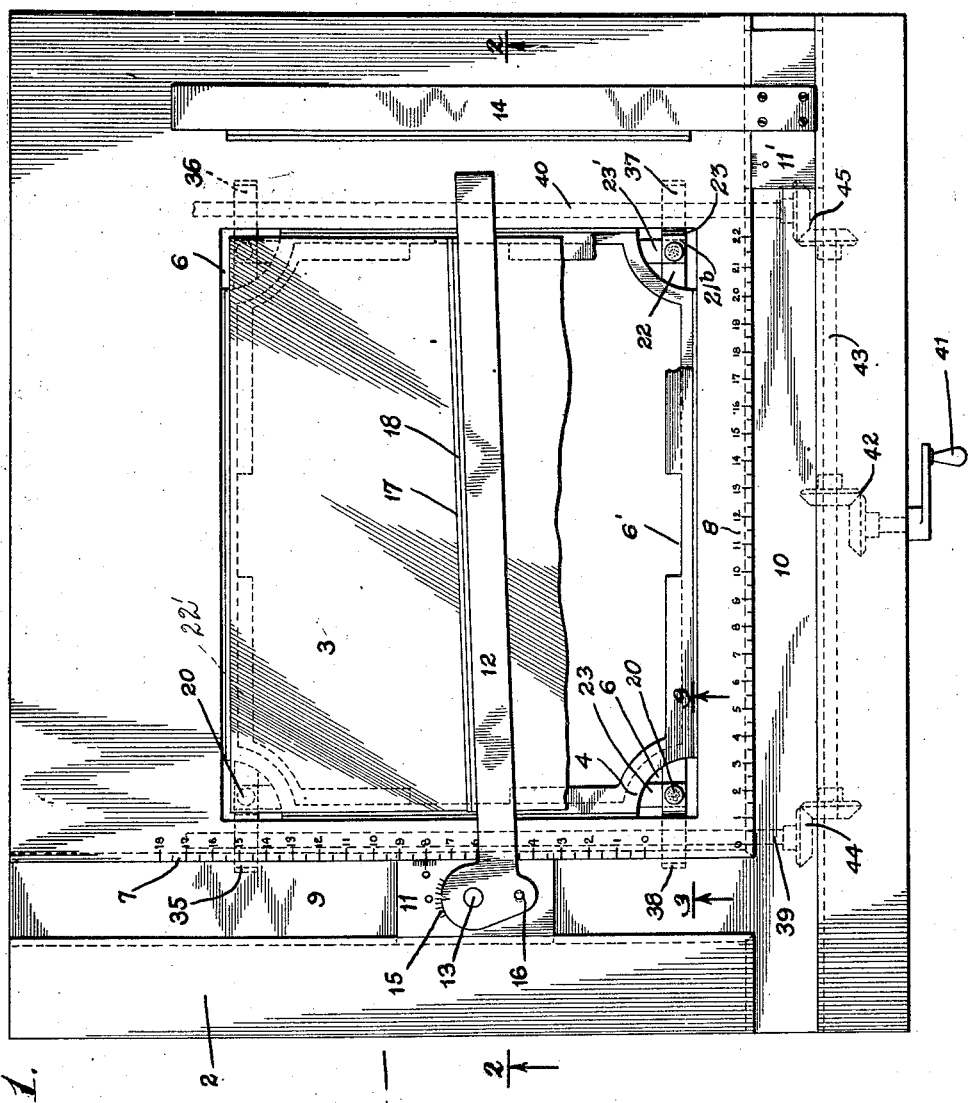
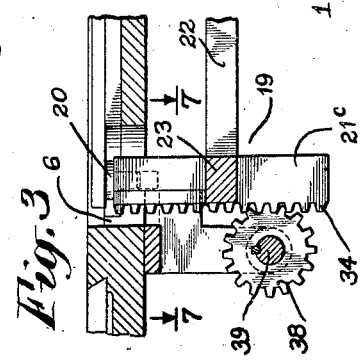
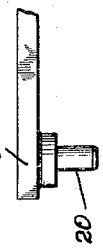
Inventor
Harry C. Jones
By his Attorneys
Ward Crosby & Smith Nov. 22, 1927.  H. C. JONES  1,650,132
METHOD OF AND MEANS FOR REGISTRATION OF PHOTOGRAPHIC PLATES
Filed Feb. 24, 1923  3 Sheets-Sheet 2
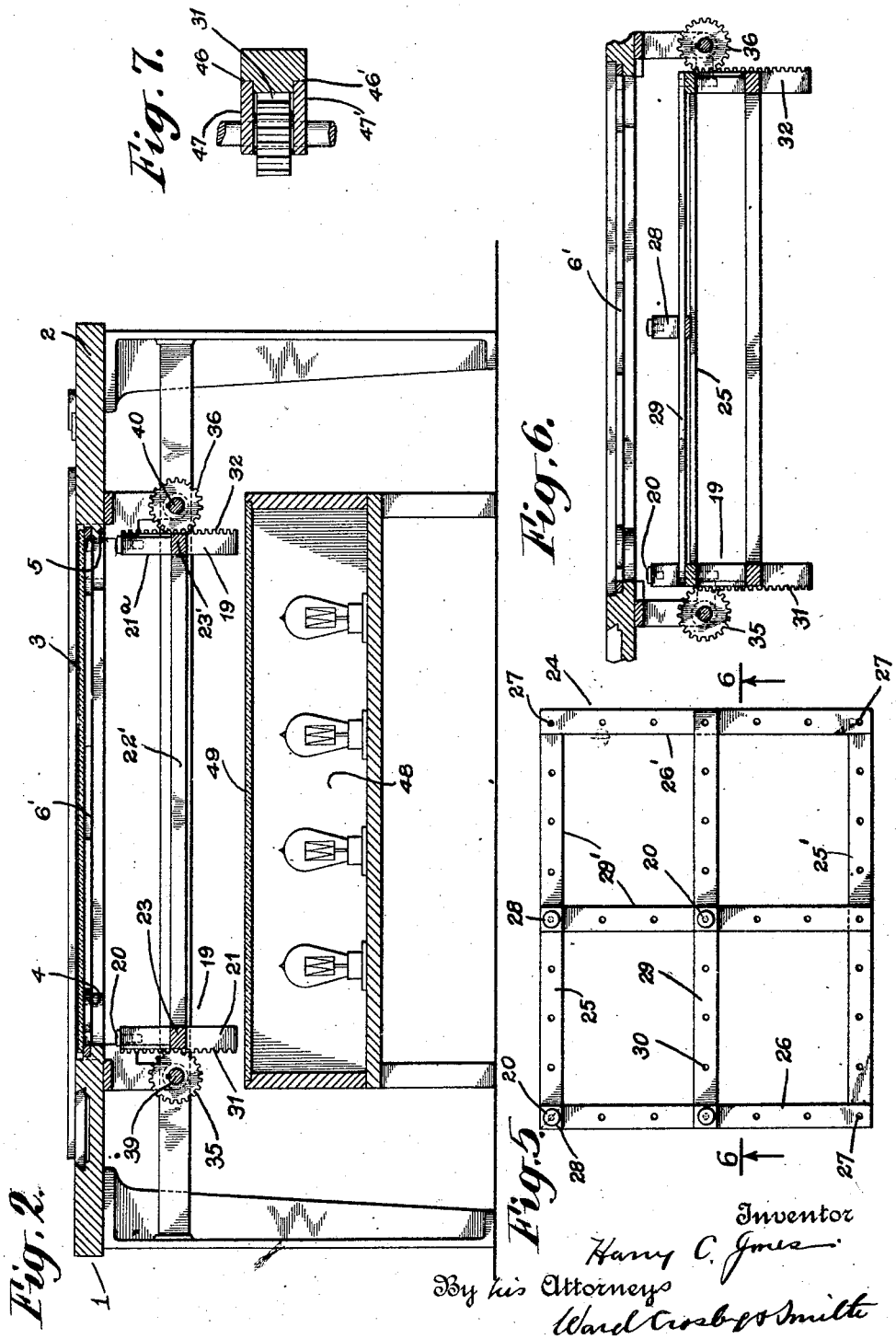

Nov. 22, 1927.  H. C. JONES  1,650,132
METHOD OF AND MEANS FOR REGISTRATION OF PHOTOGRAPHIC PLATES
Filed Feb. 24, 1923  3 Sheets-Sheet 3
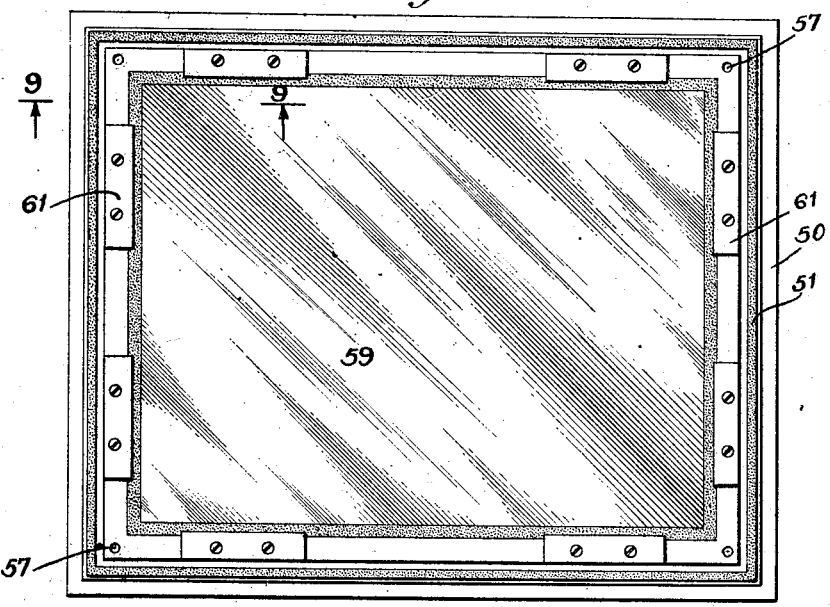
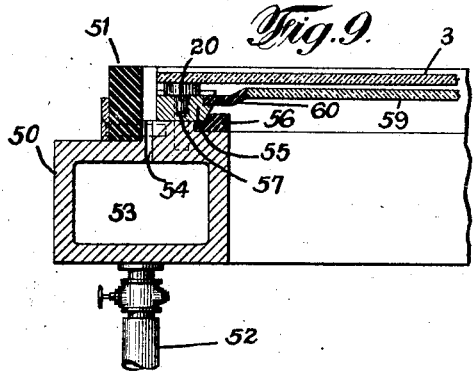
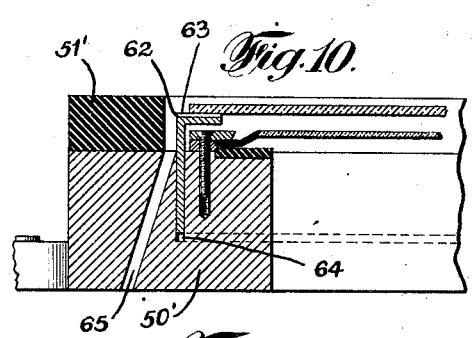
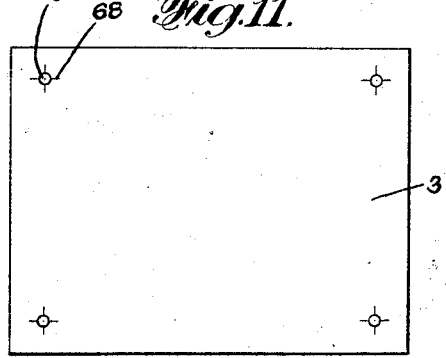
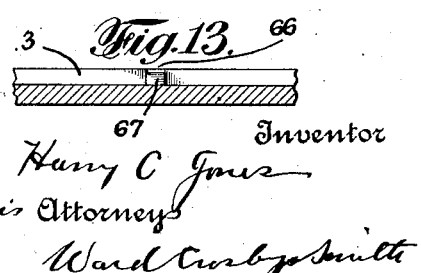
Inventor
Harry C Jones
By his Attorney Patented Nov. 22, 1927.

1,650,132

UNITED STATES PATENT OFFICE.

HARRY C. JONES, OF LARCHMONT, NEW YORK, ASSIGNOR TO LITHOPRINTEX CORPORATION, OF NEW YORK, N. Y., A CORPORATION OF NEW YORK.

METHOD OF AND MEANS FOR REGISTRATION OF PHOTOGRAPHIC PLATES.

Application filed February 24, 1923. Serial No. 620,870.

The invention relates to method of and means for registration of photographic plates, and the invention is especially useful for the accurate positioning in a reproducing machine such as a photo-composing machine, of photographic plates, each bearing a component part of a color design or picture; but the invention is useful in the positioning of photographic plates in other types of machines and supporting frames.

As is well understood, when a plurality of ultimate printing surfaces, such as zinc plates, are made up for printing a color job, each zinc plate having thereon component parts of a plurality of color designs or pictures, one component of each design or picture, the photographic plates from which the component images are printed onto the zinc plates must be adjusted to coincidence with respect to suitable registration means. Heretofore this has usually been accomplished by relying upon optical means of registration to adjust the photographic plates to position in the reproduction or other machine or frame, such for example as by marking, scratching or photographing register marks on the photographic plate, and utilizing these in positioning the plate by sighting the register mark upon some reference or registration indicating means such as horizontal and longitudinal hair lines, etc.; or the plate may be positioned by optically matching or fitting the component design of the plate into the design of another and already positioned plate. Such registration of a photographic plate relying upon sight is all right when working upon a registration table designed for that purpose and where the necessary precision instrumentalities are provided in convenient form; but it is not a satisfactory means of insuring accurate registration of the photographic plate in reproducing machines, such for example as a photo-composing machine, a step and repeat machine, and other types of machines which are usually located in a dark room, and which are either lacking in the precision instrumentalities for accurate registration or do not have them in convenient form for reliable use.

It is one of the objects of this invention to effect registration by the use of what may be termed positive physical interfitting registration means. In carrying out the invention the plate is provided with physical registration means bearing a definite relation to the vertical and horizontal axes of the design or subject on the photographic plate, said physical registration means also bearing a definite registration relation to, and being adapted to positively interfit with other mating positive registration means provided on the support or member upon which the plate is to be positioned for the printing or copying operation, so that when the interfitting means of the plate are fitted against, into or onto the mating means of the plate support in the reproducing machine, it will be assured that the plate is in the same relative registration position upon its supporting frame that it occupied upon the registration table where it was provided with said positive registration means.

For example, the plate may be adjusted on the registration table until the position of its design coincides with the position to which other related designs had been adjusted, and then accurately positioned small dowel pins may be cemented to the plate while it is held in its adjusted position, and after these pins have been firmly attached to the plate, as by cementing, the plate may then be accurately positioned upon its supporting frame in a photo-composing machine, simply by adjusting the plate to a position where the dowel pins will fit into holes in the frame corresponding to the dowel pins; or the plate may be provided with holes or slots, and the frame provided with correspondingly positioned interfitting projections.

A further object of the invention is the provision of apparatus for applying to the plate said positive registration means.

The invention consists in the method herein described and in the novel features, arrangement, construction and combination of parts of the apparatus and means hereinafter described in accordance with certain preferred embodiments thereof, and the invention will be more particularly pointed out in the appended claims.

Further objects of the invention will more fully appear from the following description taken in connection with the accompanying drawings illustrating the preferred embodiment of the apparatus used in the carrying out of the method.

Referring to the drawings illustrating by way of example the preferred embodiment of apparatus used in carrying out the invention, Fig. 1 is a plan view of a registration table embodying the invention;

Fig. 2 is a sectional view of the same taken on line 2—2 of Fig. 1;

Fig. 3 is an enlarged fragmentary sectional view taken on line 3—3 of Fig. 1;

Fig. 4 is a detail showing one of the register pins cemented to the photographic plate;

Fig. 5 is a plan view of a modified movable frame on the table for carrying the register pins;

Fig. 6 is a sectional view taken on line 6—6 of said frame when in position on the table;

Fig. 7 shows a detail;

Fig. 8 shows a plan view of a printing support upon which the plate is to be positioned in registration for printing;

Fig. 9 is an enlarged sectional view of the same taken on line 9—9 of Fig. 8;

Fig. 10 is a similar view of a somewhat modified printing support for the plate;

Fig. 11 is a reduced plan view of the photographic plate having certain positive physical registration means applied thereto; and Figs. 12 and 13 are enlarged details illustrating other forms of mating physical registration means.

Referring to the drawings (Figs. 1 to 7, inclusive), 1 is a suitable table or support which according to the present form of the invention, is arranged and constructed as a registration table, said table having a top 2 having a large opening therein so as to form in effect an open frame for accommodating the photographic plate 3 adapted to be supported in any suitable manner within or over the opening so as to be capable of angular adjustment within its own plane. In the present form of the apparatus an auxiliary open metal frame 4 is provided for receiving and supporting the negative 3, and this frame 4 is mounted on countersunk shoulders 5 formed in the main frame or table top. This auxiliary frame 4 has its corner portions cut away or inset to provide openings 6 at these points, for purposes hereinafter to be described.

The top of the table may also be provided with any suitable registration reference and indicating means, many of which are well known in the art, for the purpose of enabling the adjustment of the photographic plate to coincidence or registration upon the table. In the present apparatus the table is provided with scales 7, 8, bordering two adjacent sides of the opening in the table, and parallel with these scales are provided guides or slideways 9, 10 for respectively guiding slides 11, 11'. The slide 11 is provided with a "straight edge" 12 swiveled on the slide at 13 and extending across the opening in the table, while the side 11' is provided with a similar "straight edge" 14. The base of the "straight edge" 12 and the adjacent portion of the slide may be provided with a suitable scale arrangement 15 and with a dowel pin 16, for locking the straight edge 12 at its normal position,—i. e., at right angles to the adjacent scale. The straight edge 14 is herein shown as rigidly secured to its slide 11', but it will be understood that both straight edges may be swiveled or arranged as desired. The straight edge 12 carries along one of its edges a strip of glass 17 having a hair line 18, and the straight edge 14 is similarly equipped.

These straight edges and scales are merely for the purpose of establishing over the opening the proper axes to which the corresponding axes of the subject or design of any photographic plate are to be adjusted to coincidence, as is well understood, and such apparatus may be referred to generally as registration indicating or reference means.

The table is also equipped with apparatus for applying the said positive physical registration means to the negative, and in the present apparatus this is accomplished as follows: Beneath the frame 4 I provide a suitable movable frame 19 adapted to be moved back and forth toward and from the photographic plate and accurately guided in its movements along a definite predetermined path, and also adapted to support in proper position thereon the positive physical registration means that are or is to be affixed to the photographic plate, such means in the present instance being shown as in the form of small dowel pins 20, shown in detail in Fig. 4.

The movable frame 19 may be of any suitable arrangement and construction, and may be operated in any suitable manner, and in the present form of the invention it is constructed and operated as follows:

Referring to Figs. 1, 2 and 3, the frame is provided with four upright members 21, 21ª, 21ᵇ, 21ᶜ rigidly connected by horizontal side members 22, 22' and by end members 23, 23' and the head of each of the upright members is provided with a hole to receive one of the four dowel pins 20, the holes in these members bearing proper registration relation with respect to similar holes 57 for example (Fig. 9) in the printing support 50 upon which the negative with the dowel pins attached is to be placed, so that when the negative has been adjusted to the proper registration position on the table and the dowel pins then moved into engagement and secured to the plate, the plate is bound to have proper registration when its pins are fitted into the holes on the printing support.

For the purpose of enabling the apparatus to be used in connection with negatives of widely differing sizes, a form of movable frame may be used of such a character as to enable the positioning of the physical registration means at different positions thereon, and in Figs. 5 and 6 I have illustrated a modified form of the frame 19 arranged and constructed for this purpose. In this form of the frame an auxiliary open frame 24 is provided at the upper ends of the upright members 21, 21ª, 21ᵇ and 21ᶜ, this frame consisting of side members 25, 25' secured to the heads of the uprights, and end members 26, 26' secured to the ends of these side members, each corner of this auxiliary frame being provided with holes 27 for receiving small upwardly projecting and properly aligned extensions in the form of blocks 28, which may be secured by simply having a dowel pin in their lower surface dropped into the holes 27. In Fig. 5 one of these blocks 28 is shown in the upper left hand corner of the frame. The frame is further provided with cross bars 29, 29' preferably crossing the frame at right angles one to the other, and each provided with a number of holes 30 of a character adapted to fit the pins extending from the lower surface of the blocks such as blocks 28. By suitably adjusting these cross bars 29, 29' along the respective sides of the frame, a rectangular opening of the desired size may be made to correspond to any particular size of negative to be used in connection with the apparatus, and knowing the rectangle defined by the registration means on the printing support for the particular plate, it will be a simple matter to adjust these cross bars so as to adjust the blocks 28 to positions where the dowel pins 20 to be carried therein will outline a corresponding rectangle, or in other words, to adjust these cross bars so that the positive physical registration means to be carried by the movable frame will bear the proper registration relation to the corresponding registration means on the printing support on which the negative is to be used. When this adjustment of the cross bars is made and the blocks 28 positioned at the corners of the rectangle, the frame will then be used as heretofore described, it being understood that in this case the auxiliary open frame for holding the negative in place above the movable frame 19 will have suitable openings or inset portions along its sides, such for example as the opening 6' for permitting the dowel pins to move up into engagement with the negative. Both forms of the movable frame 19 are guided and actuated in the same manner as will now be described.

The four upright members of the frame 19 are provided with racks 31 to 34, inclusive, and these racks mesh respectively with pinions 35 to 38, inclusive. The pinions 35 and 38 are keyed to a horizontal drive shaft 39, while the pinions 36 and 37 are keyed to a horizontal drive shaft 40; and these two shafts are driven in any suitable manner such for example as by a crank handle 41 (see Fig. 1) geared by bevel gears 42 to a shaft 43 which in turn is geared by bevel gears 44 and 45 to said shafts 39 and 40, so that by turning the crank handle the frame 19 is moved up and down with the driving force uniformly applied at all four corners. Adjacent each corner of the frame it is also preferably provided with suitable guiding means to assure an accurate linear movement of the frame toward and from the plate, and in the present form of the invention the guides are adjacent the racks as is illustrated in Fig. 7, showing one of the racks, such as 31, having on each side thereof a slideway or groove 46, 46' fitting corresponding guides 47, 47' extending from the table frame. It will be understood that the guides at each corner of the table will be similar or that any suitable well known construction of guiding means may be employed.

Beneath the movable frame 19 there is provided a suitable light source such as a bank of lamps 48 preferably covered by a ground glass 49 to facilitate the registration work on the table.

It will be understood that as to any photographic plates to which the registration marks are to be applied, it will be determined beforehand upon what machine or machines (such as a vacuum frame of a photo-composing machine) said plates are to be used for printing the subjects or designs therefrom, and therefore the position or positions of the positive physical registration means on the support or frame upon which the photographic plate is to be used, is known, and the corresponding or interfitting positive physical registration means to be applied to the photographic plate by means of the present apparatus will be positioned on the movable frame 19, so as to be in relative registration relation with respect to said mating registration means on said support on which the plate is to be used for printing or copying purposes.

In the present apparatus the registration determining dowel pins 20 will therefore be so positioned on the frame 19 as to bear this relative registration relation with respect to the corresponding holes or openings in the support upon which the photographic plate is to be subsequently used for printing.

The method of using the apparatus thus far described will be as follows: The negative bearing one of the composite subjects or designs of the multiple color job will be taken to the table and there positioned to coincidence,—i. e., in proper registration relation with respect to the registration reference or indicating means of the table, and it will be understood that if this is the first plate of the series to be adjusted, the operator will determine from the particular job in hand just how the plate is to be adjusted on the table, or if the photographic plate happens to be a subsequent one of a series, then it must be adjusted to coincidence with the position to which the previous plate was adjusted. It will be further understood that since once the positive registration means on the movable frame 19 has been positioned with reference to the support upon which the negative is to be used, it necessarily follows that when the negative plate is adjusted for registration with respect to the register indicating means on the table, it will also be adjusted for registration with respect to said positive registration means on the movable frame 19, because due to the accurate guiding of this frame in its movements toward and from the plate, the angular position between the plate and such registration means remains fixed once the plate has been adjusted on the table.

When the plate is thus properly adjusted the heads of the dowel pins may then have suitable cementitious material applied thereto, preferably a quick drying cement, and the frame is then moved to the position shown in Fig. 3, to bring the heads of the pins in contact with the negative, the pins moving up through the opening 6 in the upper frame already referred to, and coming into contact with the negative against which the pins are pressed and held until the cement has dried and the pins thus securely applied or affixed to the plate as shown in Fig. 4, whereupon the plate may then be taken over to the support or frame upon which it is to be positioned for subsequent use, such for example as for printing therefrom onto a sensitized surface such as a zinc surface.

In Figs. 8 and 9 I have illustrated a preferred form of vacuum frame upon which the plate may be mounted in proper register position for printing purposes. This frame, per se, forms the subject matter of another of my co-pending applications Serial No. 615,487, filed January 29, 1923 in which it is fully shown and described, and therefore it will only be briefly referred to here, since any suitable support for the plate will suffice so far as concerns the present invention. The vacuum frame shown is adapted to be mounted upon the movable carriage of a photo-composing machine, and is in the form of an open metal frame 50 having a rubber sealing strip 51 extending around the same, adapted to engage and form a sealing joint with the zinc plate. Any suitable means may be used to apply suction to the frame, such for example as a pipe 52 leading to a chamber 53 in the frame which in turn communicates to the upper surface of the frame through the opening 54. The frame is provided with a detachable frame member 55 extending around the frame and suitably secured thereto, with the joint between the two sealed by a sealing strip 56; and this member 55 is provided with holes 57 for receiving the dowel pins 20; there being as many holes as desired, but preferably one at each corner of the frame. The negative 3 having the dowel pins 20 in position thereon, is shown in place on the frame. As stated, the dowel pins 20 as arranged on the registration table, bear a definite registration relation with respect to the holes 57 in the printing frame so that when the dowels are secured to the plate and then fitted into the holes 57, the accurate registration of the plate on the frame is assured by the interfitting of these positive physical registration means.

The vacuum frame is also provided with suitable means for sealing off the adjacent surface of the photographic plate from the atmosphere, and this, as here shown, consists of a suitable pressure plate such as a celluloid plate 59 having a marginal strip of rubber 60 secured thereto which in turn is gripped onto the vacuum frame by means of clamping members 61.

When the vacuum frame with the negative thus supported is moved into engagement with the zinc plate to engage the same with the sealing member 51, and the air exhausted from over the sealed off surface of the zinc, the celluloid plate 59 will be forced into engagement with the negative 3 which in turn will be pressed down firmly upon the zinc plate for the printing operation.

While I have described the invention in detail with respect to the preferred form of the positive physical registration means now known to me, and in connection with the preferred form of apparatus for applying said registration means to the plate, I wish it understood that various modifications and changes may be made both in the form of the physical registration means that may be used and in the method of applying the registration means to the plate. Any suitable form of positive physical registration means may be utilized, and so far as concerns the broader aspects of the invention, it is immaterial whether the physical registration means to be applied to the plate and those to be applied to the printing frame, are both in the form of contacting projections or whether if they be respectively in the form of male and female members, the members of one kind be applied to the plate and the corresponding members of the other kind be applied to the printing support. For example, in Fig. 10 I have illustrated a slightly different form of vacuum frame showing therein a different character of positive physical registration means attached to the negative. In this figure, the frame 50' is provided with the sealing strip 51', and in general with the other parts arranged and operating in the same general manner as described in connection with the previously described vacuum frame, except that the positive registration means takes the form of an open frame 62 of angle iron section. The upper surface is suitably grooved as shown at 63, and is adapted to be cemented at suitable points, to the marginal portions of the negative, and this frame 62 has its vertical flange slidably fitting in a groove 64 extending around the frame, suction to the frame being applied through the passage 65. The positive physical registration means in this instance consists of the said frame 62 which fits in its mating or interfitting slot 64, and where such a positive physical registration means is to be utilized, it will be understood that the top of the movable frame 19 of the registration table may be suitably adapted to receive and position such character of physical registration means to be applied to the plate.

Furthermore, I contemplate applying to the photographic plate positive physical registration means in the form of slots or openings, such for example as shown at 66 in Figs. 12 and 13, adapted to abut, engage or interfit corresponding projections 67 on the printing or other support for the plate upon which the plate is to be positioned in registry position. Such slots, holes or grooves may be applied to the photographic plate in proper registry relation with the subject of the plate, in any suitable manner and by any suitable apparatus, one form of apparatus suitable for this purpose being shown and described in one of my co-pending applications Serial Number 626,905, filed March 22, 1923, for method of and apparatus for providing photographic plates with positive physical registration means.

Again, so far as concerns certain aspects of the invention, the plate may be provided in any suitable manner with what I may term optical registration marks of known form, as shown in Fig. 11, such as with crosses 68, these being put on photographically or otherwise in known manner, and then holes, such as 69, drilled in the plate at the junction of these crosses, whereupon these holes will be adapted to interfit with pins or projections from the support to which the plate is to be applied for the printing operation, and bearing registry relation to said holes.

Furthermore, so far as concerns certain aspects of the invention, it is not necessary to first photograph the image or subject on the plate and then adjust the plate to coincidence on the registration table before applying the positive physical registration means thereto in any of the forms above mentioned, but for some purposes if desired the plate may be placed in a suitable general position on the apparatus before the register marks are applied thereto, such for example as by merely abutting one or more of its edges up against some suitable abutment to position it generally substantially central of such apparatus, and then have the positive physical registration means applied thereto, whereupon the plate by means of such positive physical registration means, may be accurately positioned on the supporting frame of a copy camera having corresponding register means, and which in turn bears a definite register relation with respect to the subject to be copied, and the subject then photographed onto the plate. If each of the related plates for component subjects of the color design or picture be thus treated and used on accurately constructed copying cameras, the photographic plates thus exposed and then developed may be then used in the printing frame of the photo-composing machine in the manner heretofore described, so long as the corresponding positive physical registration means of such copying camera and those of the printing frame bear the same registration relation to the mating physical registration means applied to the plate. This necessarily follows because the physical registration means to be applied to any plate will correspond exactly and be in true coincidence or registration relation with respect to the physical registration means to be applied to each of the other component or related plates, and even if the different plates should be more or less askew with respect to the registration means thus applied, this will not matter because the positioning of the plates thereafter on the copying camera will be determined not by the trueness of the plate, but entirely by the fitting of the physical registration means of the plate against or into the corresponding physical registration means on the camera. When the image of the subject is photographed onto one plate and the image of a component subject, properly positioned on the copy board, is photographed onto another component plate, those subjects on the two plates will be in proper registration provided the camera is built as a precision machine and the copies properly positioned; and if the images have been thus properly photographed onto the respective plates, they will bear the proper registration relation with respect to the registration means on the different plates and hence to each other.

The plates having registration means thus applied thereto and exposed in a proper camera and then developed, may in all respects be the same as if the plates with the subject photographed thereon had first been positioned on the registration table and then had the register marks applied thereto, as first described.

Having thus described my invention with particularity with reference to the preferred method of carrying out the same and in connection with the preferred apparatus for carrying out the same, and having referred to some of the possible modifications thereof, it will be obvious to those skilled in the art, after understanding my invention, that other changes and modifications may be made therein without departing from the spirit and scope of my invention, and I aim in the appended claims to cover all such changes and modifications as are within the scope of the invention.

Having thus described my invention, what I claim as new and desire to secure by Letters Patent, is:

1. Method of obtaining proper position of photographic plates upon their support for reproducing their subjects in position to register one with respect to another for printing such subjects, which comprises providing a photographic plate with positive physical registration means bearing the same registration relation to the subject of said plate as similar physical registration means bear to the subject of another photographic plate to be printed in register with the subject of the first plate, and then fitting said positive registration means of said plates to corresponding interfitting positive registration means on a support for holding said plates for printing therefrom.

2. The method of providing a photographic plate with positive physical registration means, which comprises adjusting the plate to the desired angular position in its own plane with respect to said registration means, then bringing the registration means into engagement with the plate and cementing said means to the plate.

3. Method of providing a photographic plate with positive physical registration means, which comprises adjusting the plate to the desired angular position in its own plane with respect to certain register indicating means, and then bringing into engagement with the plate positive physical registration means having a predetermined registration position relative to corresponding registration means of a printing support for the plate, and also bearing similar registration position with respect to the adjusted plate, and affixing said positive physical registration means to the plate.

In testimony whereof I have signed my name to this specification.

HARRY C. JONES.